United States Patent [19]
Merritt et al.

[11] Patent Number: 4,769,624
[45] Date of Patent: Sep. 6, 1988

[54] PERMANENT MAGNET ASSEMBLY

[75] Inventors: Donald E. Merritt, Anderson; Larry J. Eshelman, Pendleton; Chester A. Hammer, Shirley, all of Ind.

[73] Assignee: General Motors Corporation, Detroit, Mich.

[21] Appl. No.: 924,785

[22] Filed: Oct. 30, 1986

[51] Int. Cl.⁴ .............................................. H01F 7/02
[52] U.S. Cl. ................................... 335/302; 310/152; 310/154
[58] Field of Search ............... 335/296, 302, 303, 306; 310/152, 154

[56] References Cited
FOREIGN PATENT DOCUMENTS
432152  7/1935  United Kingdom ................. 335/303

Primary Examiner—George Harris
Attorney, Agent, or Firm—C. R. Meland

[57] ABSTRACT

A permanent magnet assembly wherein a permanent magnet is encapsulated in a metallic housing that hermetically seals the permanent magnet. The metallic housing is formed from two stainless steel parts that are joined by a continuous impervious seam weld. The stainless steel parts take the form of a retainer having a cup portion and a plate welded to a flanged portion of the retainer. The permanent magnet is disposed within the cup portion. The permanent magnet assemblies can be welded to the internal surface of a metallic frame of a dynamoelectric machine to provide field and frame assembly for the machine.

13 Claims, 2 Drawing Sheets

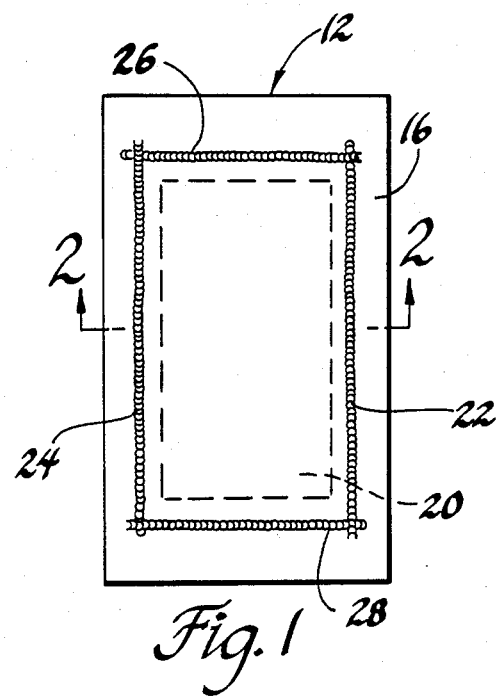
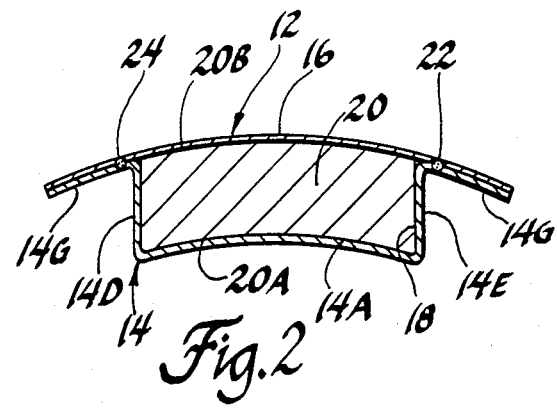
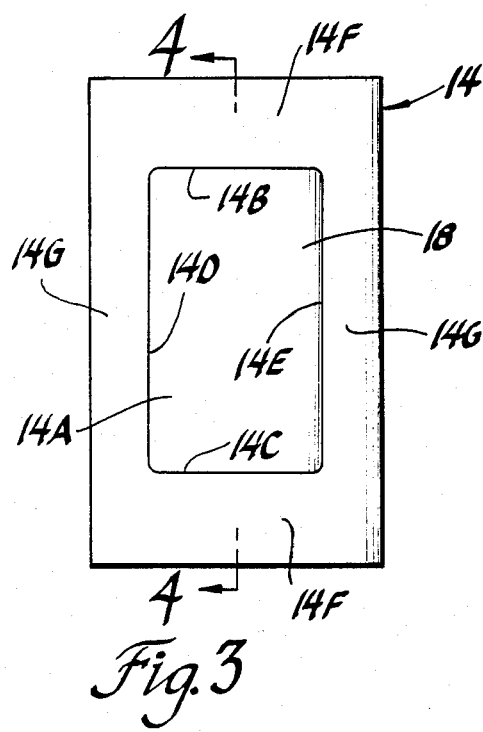
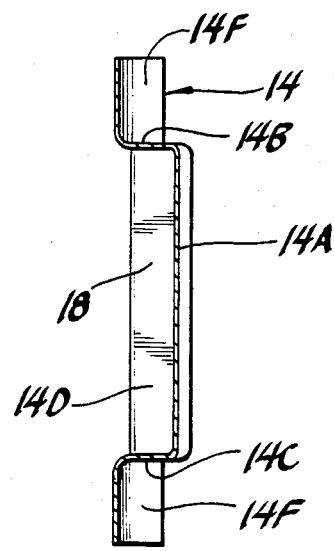
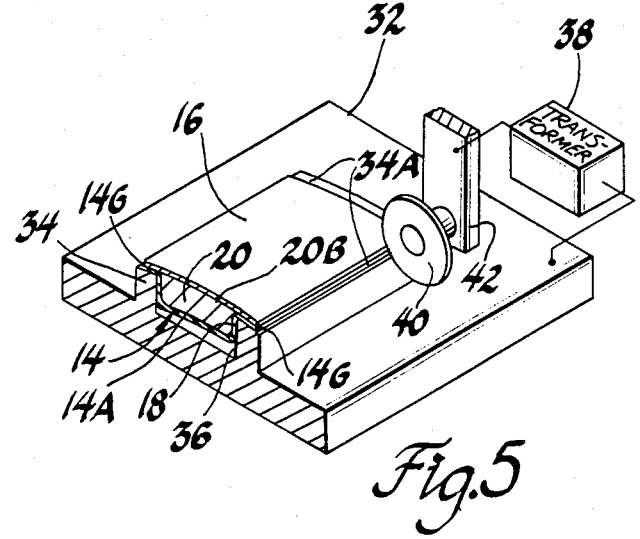

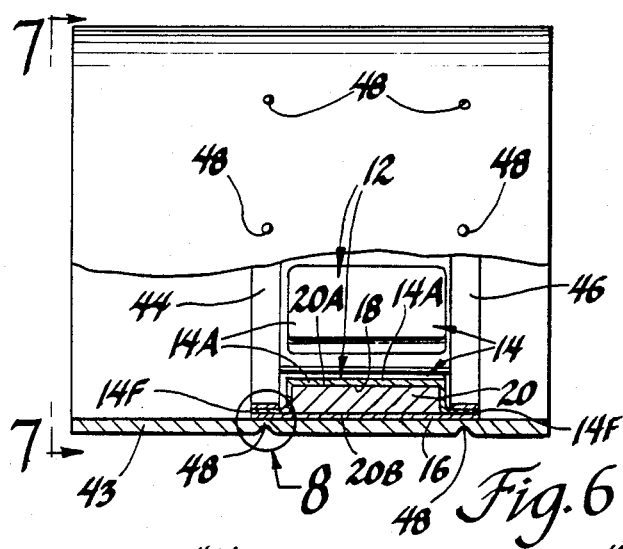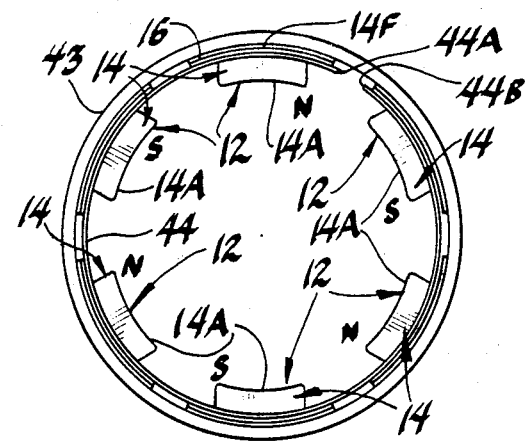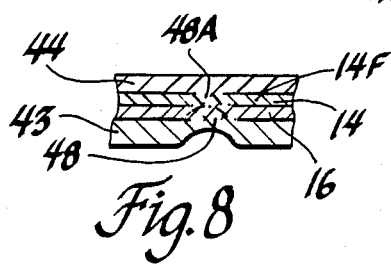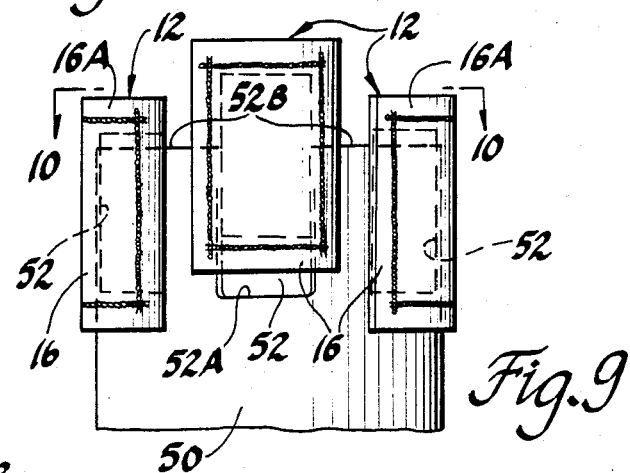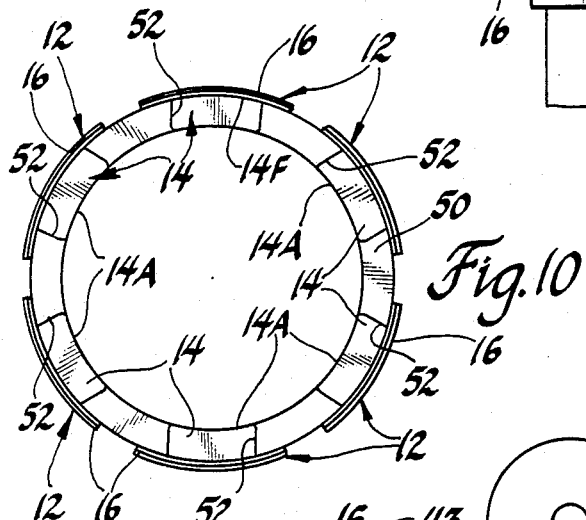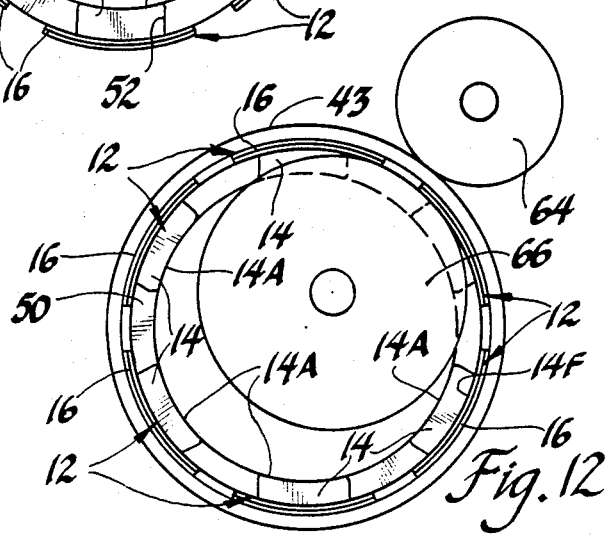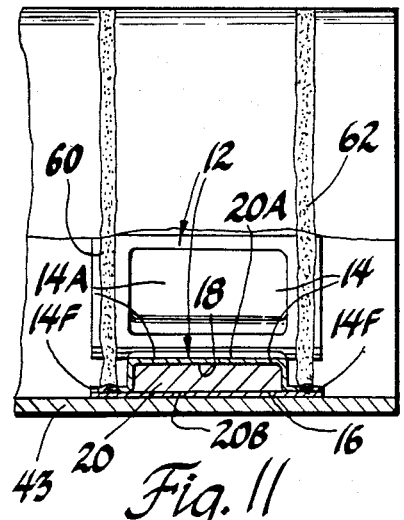

PERMANENT MAGNET ASSEMBLY

This invention relates to a permanent magnet assembly and a mounting arrangement for securing the permanent magnet assembly to the frame of a dynamoelectric machine.

Retainers or supports for supporting a plurality of permanent magnets of a permanent magnet dynamoelectric machine are known, examples being the supports disclosed in the Macoit et al. U.S. Pat. No. 3,785,250 and in Japanese published patent application No. 1982 (Showa 57) 122659 published on July 30, 1982. In the Macoit et al. patent the permanent magnets are supported by a plastic housing and in the Japanese published application the permanent magnets are disposed between an aluminum tube and the frame of a dynamoelectric machine.

It is an object of this invention to provide a permanent magnet assembly where the permanent magnet is encapsulated in an imperforate metallic housing so as to hermetically seal the permanent magnet. By entirely encapsulating the permanent magnet in a metallic housing the housing prevents the magnet from being subjected to substances such as moisture or salt spray which, if allowed to contact the magnet, could cause the magnet to corrode. The metallic housing further provides mechanical protection for the magnet and provides a strong mechanical support for the magnet. In carrying this object forward the metallic housing is formed of two metal parts that contain the magnet and these parts are seam welded together. The seam weld is made so that it forms a continuous imperforate welded joint that forms a hermetic seal between the parts. One of the parts takes the form of a magnet retainer that has a cup portion that is shaped to accommodate the permanent magnet. The other part takes the form of a plate that is welded to a flanged portion of the retainer. The retainer is formed of a nonmagnetic stainless steel and the plate is formed of a magnetic type of stainless steel. The permanent magnet assemblies, after being manufactured, are available as sub-assemblies for incorporation into electrical apparatus.

Another object of this invention is to provide a permanent magnet assembly that is encapsulated in metallic material that is adapted to be welded to the inner surface of a metallic frame of a dynamoelectric machine.

Still another object of this invention is to provide an improved field frame assembly for a dynamoelectric machine wherein a plurality of metallic magnet retainers that contain permanent magnets are welded to a metallic frame of a dynamoelectric machine.

IN THE DRAWINGS

FIG. 1 is a plan view of a permanent magnet assembly made in accordance with this invention;

FIG. 2 is a sectional view taken along line 2—2 of FIG. 1;

FIG. 3 is a plan view of a retainer which forms a component of the assembly shown in FIGS. 1 and 2;

FIG. 4 is a sectional view taken along lines 4—4 of FIG. 3;

FIG. 5 is a view, partly in section, illustrating welding apparatus for seam welding a retainer and plate member that are components of the assembly shown in FIGS. 1 and 2;

FIG. 6 is a plan view with parts broken away of a frame of a dynamoelectric machine that has permanent magnet assemblies welded thereto;

FIG. 7 is an end view of the frame shown in FIG. 6 looking in the direction of the arrows 7—7 of FIG. 6;

FIG. 8 is an enlarged view of a portion of FIG. 6;

FIGS. 9 and 10 illustrate a fixture for holding permanent magnet assemblies when they are welded to a frame;

FIG. 11 is a view like FIG. 6 which illustrates a modified welding arrangement for welding permanent magnet assemblies to a frame; and FIG. 12 illustrates welding apparatus for making the welds illustrated in FIG. 11.

Referring now to the drawings and more particularly to FIGS. 1–4, the reference numeral 12 generally designates a permanent magnet packet or assembly wherein a permanent magnet is entirely encapsulated in a metallic housing. The metallic housing that encapsulates the permanent magnet is comprised of a retainer 14 and a cover plate 16 that are welded together in a manner that will be described. The retainer 14 is preferably formed of a nonmagnetic stainless steel material such as AISI 302 stainless steel. The plate 16 is formed of a magnetic stainless steel such as AISI 430 stainless steel.

The retainer 14 has a cup portion that provides a cavity 18 that receives a permanent magnet 20. This cup portion is defined by a curved or arcuately extending wall 14A, flat planar end walls 14B and 14C and flat planar side walls 14D and 14E. The retainer 14 further has end flange portions 14F and side flange portions 14G. These flange portions are curved as is illustrated in the drawings.

The reference numeral 20 designates a rectangular permanent magnet that is disposed within the cavity 18. This permanent magnet may be a type that is disclosed in European published patent application No. 0 144 112-A1 published on Dec. 6, 1985. The permanent magnet 20 has the same shape as cavity 18 and it has a curved or arcuately extending surface 20A that engages an internal surface of wall 14A. The outer side walls of the permanent magnet are flat and engage the internal flat surfaces of retainer walls 14B, 14C, 14D and 14E. The permanent magnet has another curved or arcuately extending surface 20B that engages an internal surface of cover plate 16, as illustrated in FIG. 2.

The cover plate 16 is curved to match the curved flanged portions of retainer 14 and it engages the flanged portions as illustrated in FIG. 2. The cover plate 16 is seam welded to the flange portions of retainer 14 along seam welded lines 22, 24, 26 and 28 which are illustrated in FIG. 1. The seam welds are made by resistance welding in a manner that will be more fully described hereinafter. The individual welds are made so close together that a continuous joint or weld is provided between cover 16 and retainer 14 along weld lines 22, 24, 26 and 28. Since the welds (22, 24, 26 and 28) are continuous joints and since the weld lines extend completely around the permanent magnet the welded joints will not allow the entry of outside air or moisture into contact with the permanent magnet 20. The continuous welds therefore provide an impervious hermetic seal for the permanent magnet 20 against the entry of substances that might corrode the permanent magnet. One example of such a substance is salt spray. Since the cover 14 and plate 16 are joined by impervious seam welds the permanent magnet 20 is entirely encapsulated in the stainless steel material of retainer 14 and plate 16. It is pointed out that the seam welds 22–28 are positioned so that they are located just outside of the retainer walls 14B, 14C, 14D and 14E to thereby allow sufficient retainer flange area for welding to a motor frame in a manner to be described.

The apparatus for making the impervious seam welds 22, 24, 26 and 28 between the flanges of retainer 14 and plate 16 will now be described in connection with FIG. 5. In FIG. 5, the reference numeral 32 designates a copper block that serves as a welding electrode and support for parts 14 and 16. The support 32 has a rectangular axially extending wall 34 that defines a cavity 36 for receiving the cup portion of retainer 14. The rectangular wall 34 has top surfaces 34A that are curved. The support 32 is electrically connected to a resistance welding transformer 38. The apparatus of FIG. 5 further includes a copper wheel or roller 40 supported for rotation by support 42. The roller 40 is electrically connected to welding transformer 38 and forms a resistance welding electrode.

Prior to making the seam welds 22–28 a permanent magnet 20 is placed in cavity 18. The cover 16 can be secured to retainer 14 by a few welds which are sufficient to hold the cover fixed to the retainer or mechanically held. The retainer 14, with the cover fixed thereto, is now mounted on the copper block or support 32 with the cup portion of the retainer that defines the cavity 18 fitting into cavity 36 and with the flanges of the retainer 14 engaging the curved surfaces 34A. In this regard, the shape of surfaces 34A conform to the shape of the flanges 14F and 14G. With the retainer and attached plate mounted to support 32 the roller 40 is brought into contact with plate 16. Welding current is now applied to support 32 and roller 40 and these parts operate as welding electrodes to resistance weld the flanges of retainer 14 to the plate 16. As welding current is applied the support 32 it is moved by a mechanism, that is not illustrated, and roller 40 during this movement of support 32 rolls on plate 16. As support 32 moves a seam weld is formed the length of which corresponds to amount of movement of support 32. The rate of movement of support 32 and the control of welding current are so coordinated that a series of individual welds are produced that are so close together that a continuous welded joint that is impervious to moisture and air is produced.

When the support 32 has been moved, to produce for example weld line 22 shown in FIG. 1, the support is rotated to a position where another weld line, for example weld line 26, can be produced. The support 32 is sequentially rotated and traversed until all of the weld seams 22, 24, 26 and 28 have been made. The weld seams extend slightly beyond the points where they intersect to assure that a hermetic weld seal is made.

In the description of this invention, part 20 has been referred to as a permanent magnet and in order to produce a permanent magnet is it necessary to magnetize a magnetic material. It is preferred that the block of magnetic material that forms permanent magnet 20 be axially magnetized after it has been enclosed or encapsulated by retainer 14 and cover 16 in a manner that has been described.

One of the uses for the encapsulated permanent magnet of this invention is to provide a magnetic field for an electric motor which may be an electric cranking motor for an electric engine starter. A field frame for an electric cranking motor that utilizes the encapsulated permanent magnets, that have been described, is illustrated in FIGS. 6 and 7. Referring now to FIGS. 6 and 7, the field assembly comprises a tubular steel frame 43. The frame carries a plurality of circumferentially spaced permanent magnet assemblies, each of which is identical with the assembly shown in FIGS. 1 and 2. By way of example, six assemblies can be used as shown in FIG. 7.

The permanent magnet assemblies 12 are welded to internal surfaces of frame 43 by projection welding and by the use of two rings 44 and 46 that engage the flanges 14F of retainer part 14. The rings 44 and 46 are identical and extend over all of the flanges 14F. These rings are not continuous rings but rather have ends that are slightly separated from each other. This is illustrated in FIG. 7 where opposed ends 44A and 44B of ring 44 are shown slightly separated. The rings 44 and 46 are both formed of stainless steel which may be the same type of stainless steel that is used for retainer 14.

Both rings 44 and 46, the plate 16 and the flanges 14F are projection welded to radially inwardly extending projections or dimpled in portions 48 of frame 43. The portions 48 of frame 43 are formed by impacting the frame with a suitable tool to force frame material inwardly to form the projections 48. There are twelve projections 48, two for each magnet assembly and each pair of projections are aligned with the circumferential centers of a pair of respective flanges 14F.

When projection welding the plate 16, flanges 14F and rings 44 and 46 to projections 48 the magnet assemblies 12 are all positioned in the position shown in FIG. 7 and retained in that position by a fixture which will be described hereinafter. The plates 16 now engage the frame projections 48 and the rings 44 and 46 are placed into engagement with flanges 14F. The projections 48 are now projection welded to plate 16, flanges 14F and rings 44 and 46 over spots or areas aligned with projections 48 by engaging the frame 48 and the rings with suitable resistance welding electrodes that concentrate the welding energy into spots or areas aligned with projections 48. The projection welds are designated as 48A and one of these welds is illustrated in FIG. 8.

Referring now to FIGS. 9 and 10, a fixture is illustrated for holding the permanent magnet assemblies 12 in proper position to permit them to be projection welded to motor frame 43. FIG. 9 is a side view of the fixture and FIG. 10 is an end view of the fixture. The fixture is designated by reference numeral 50. The fixture 50 is cylindrical or tubular and one end of the fixture has six recesses or slots 52 that are circumferentially spaced by the desired circumferential spacing of the permanent magnet assemblies 12. When utilizing the fixture, the permanent magnet assemblies 12 are inserted into the slots 52. When a magnet assembly is inserted into a slot 52 it is inserted such that retainer wall 14A faces inwardly as shown in FIG. 10. When an assembly is fully inserted into a slot 52 one of the retainer end walls 14B or 14C will engage a lower wall or edge 52A of a slot 52. The axial length of a slot from a lower wall or edge 52A to edges 52B is such that when a magnet assembly is fully inserted into a slot 52 a portion 16A of plate 16 extends beyond edges 52B as does one of the flanges 14F located behind portion 16A. The fixture therefore does not get in the way of welding electrodes during welding.

When all of the magnet assemblies have been inserted into the slots 52 of the fixture 50 the fixture and the magnet assemblies carried thereby are inserted into the frame 43 to the desired position. With the magnet assemblies in proper position one of the rings 44 or 46 is placed in position and the ring, the plate 16 and one group of flanges 14F are then projection welded to projections 48. Once a ring and one group of flanges has been projection welded the fixture is withdrawn from the frame 43. The other group of flanges, the plate 16 and other ring can now be projection welded without the aid of the fixture since the magnet assemblies are held fixed to the frame 43 by the fact that one ring and one group of flanges have been welded to the frame 43.

FIG. 11 illustrates a modified arrangement for securing the magnet assemblies 12 to the frame 43 where the flanges 14F of retainer 14 and portions of plates 16 have been resistance seam welded to internal surfaces of frame 43 without the use of rings such as rings 44 and 46. In FIG. 11 two seam welds 60 and 62 are illustrated which weld portions of flanges 14F and portions of plates 16 to the frame 43. These seam welds each extend for the entire circumferential extent of each flange 14F. The seam welds 60 and 62 need not be of a type that forms a hermetic seal or in other words, not provide a continuous joint.

An apparatus for forming the seam welds 60 and 62 is illustrated in FIG. 12. In FIG. 12 a pair of copper power driven rollers or wheels 64 and 66 are shown with wheel 64 engaging the outer periphery of motor frame 43. The magnet assemblies 12 are held in position by a fixture 50 like the one shown in FIGS. 9 and 10 which is secured to frame 43 to rotate therewith. The inner wheel 66 engages an inner surface of frame 43 and flanges 14F as the motor frame is rotated. In this regard, the wheels frictionally engage the motor frame to rotatably drive the motor frame and the magnet holding fixture 50 that is secured to the frame rotates with the frame. The wheels 64 and 66 forms resistance seam welding electrodes which are connected to a source of welding power that has not been illustrated. Therefore, as the wheels 64 and 66 rotatably drive frame 43 the seam welds 60 and 62 will be produced. If it is not desired that frame 43 be heated by welding current during the time that roller 66 is not contacting a flange 14F the welding current can be turned off when the wheel 66 is out of contact with a flange 14F.

The stainless steel retainer 14 is formed by a drawing operation in which a flat sheet of stainless steel is drawn to the shape illustrated in FIGS. 3 and 4. During this drawing operation corners of the cup portion may be stressed to such an extent as to cause the corners to exhibit magnetic properties. If it is desired that the corners have the same nonmagnetic properties as the remainder of the retainer, the retainer, after being drawn to shape, can be annealed to cause any portion of the retainer that has been rendered magnetic by the drawing operation to revert back to the nonmagnetic condition.

The field assembly shown in FIGS. 6 and 7 will provide magnetic flux for an electric motor and when so used the armature of the motor will rotate within the permanent magnets and the flux developed by the permanent magnets will be coupled to the armature.

A flux path may be traced for example from a north pole of one magnet to the south poles of adjacent magnets. The flux path for a given magnet includes motor frame 43, plate 16 and a pole face 14A of a retainer 14. As previously mentioned, plate 16 is formed of a magnetic stainless steel while pole face 14A is formed of a nonmagnetic stainless steel.

It should be pointed out that the plate 16 could be formed of steel material that is not stainless steel, for example a type M2234 steel material. Where the plate 16 is formed of steel rather stainless steel the corrosion resistance of the packet or assembly 12 is reduced since stainless steel has greater corrosion resistance.

By way of example and not by way of limitation, the thickness of the stainless steel material that forms retainer 14 may be about 0.009 inches and the thickness of stainless steel plate 16 about 0.003 inches.

The embodiments of the invention in which an exclusive property or privilege is claimed are defined as follows:

1. A permanent magnet assembly comprising, an imperforate metallic retainer having a cup portion and a flange portion disposed about the open end of said cup portion, a permanent magnet disposed within said cup portion, and an imperforate metallic cover plate member extending across one end of said magnet and welded to said flange portion of said retainer, the weld between said cover member and flange portion being continuous and impervious whereby said permanent magnet is hermetically sealed.

2. The permanent magnet assembly according to claim 1 where the retainer is formed of a nonmagnetic stainless steel and the plate member is formed of steel material that, is magnetic.

3. The permanent magnet assembly according to claim 1 where the retainer is formed of a nonmagnetic stainless steel and the plate member is formed of a stainless steel material that has magnetic properties.

4. A field and frame assembly for a dynamoelectric machine comprising, a metallic frame formed of magnetic material having a surface, and a permanent magnet secured to said surface of said frame by an imperforate metallic retainer, said retainer having flange portions and having a cup portion defining a cavity, at least some of said flange portions being welded to said surface of said frame, the open end of said cavity facing said surface of said frame, said permanent magnet disposed within said cavity and positioned between a surface defining a part of said cavity and said surface of said frame.

5. The field and frame assembly according to claim 4 where the retainer is formed of nonmagnetic stainless steel.

6. A field and frame assembly for a dynamoelectric machine comprising, a metallic frame formed of magnetic material, a permanent magnet assembly carried by said frame comprising a permanent magnet that is encapsulated by imperforate metallic housing means that hermetically seals said permanent magnet, and means securing said housing means to said frame.

7. The field and frame assembly according to claim 6 where the housing means is formed of stainless steel.

8. A field and frame assembly for a dynamoelectric machine comprising, a metallic frame formed of magnetic material having an internal surface, a permanent magnet assembly secured to said surface, said permanent magnet assembly comprising a permanent magnet, an imperforate metallic retainer and an imperforate metallic plate, said retainer having flange portions and a cup portion defining a cavity, said plate member welded to said flange portions of said retainer by a continuous imperforate welded joint, said permanent magnet located in said cavity and totally enclosed by said retainer, plate and welded joint, and means securing said magnet assembly to said internal surface of said frame with said plate engaging said internal surface of said frame.

9. The field and frame assembly according to claim 8 where the retainer is formed of nonmagnetic stainless steel.

10. The field and frame assembly according to claim 8 where the retainer is formed of nonmagnetic stainless steel and the plate is formed of magnetic stainless steel.

11. The field and frame assembly according to claim 8 where the means for securing the permanent magnet assembly to the internal surface of the frame comprises welded joints that join flange portions of the retainer and portions of said plate to said internal surface of said frame.

12. A field and frame assembly for a dynamoelectric machine comprising, a metallic frame formed of magnetic material having a circumferentially extending internal surface, a plurality of circumferentially spaced permanent magnet assemblies secured to said internal surface of said frame, each permanent magnet assembly comprising an imperforate metallic retainer having opposed flanges and a cup portion defining a cavity, each permanent magnet being disposed within a said cavity and located between a wall of said cavity and said internal surface of said frame, said frame having a plurality of circumferentially spaced projections that extend radially inwardly from said internal surface of said frame, said projections being aligned with respective flanges of said retainer, a pair of metallic rings respectively engaging an outer surface of respective flanges of said retainer, a welded joint connecting each projection to a respective flange and to a respective ring, said flanges being located in parallel planes that are normal to the longitudinal axis of said frame.

13. A field and frame assembly for a dynamoelectric machine comprising, a metallic frame formed of magnetic material having a circumferentially extending internal surface, a plurality of circumferentially spaced permanent magnet assemblies secured to said internal surface of said frame, each permanent magnet assembly comprising an imperforate metallic retainer having opposed flanges and a cup portion defining a cavity, a permanent magnet disposed within a said cavity and located between a wall of said cavity and said internal surface of said frame, said opposed flanges being located respectively in a pair of parallel planes that are normal to the longitudinal axis of said frame, said opposed flanges being welded to said internal surface of said frame by circumferentially extending seam welds.

* * * * *